(12) United States Patent
Ferk et al.

(10) Patent No.: US 11,485,561 B2
(45) Date of Patent: Nov. 1, 2022

(54) RECLOSABLE PACKAGE AS WELL AS THERMOFORM PACKAGING MACHINE AND METHOD

(71) Applicant: Multivac Sepp Haggenmüller SE & Co. KG, Wolfertschwenden (DE)

(72) Inventors: Florian Ferk, Bad Grönenbach (DE); Norbert Kottek, Bad Grönenbach (DE); Tilman Hulwa, Walkertshofen (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 307 days.

(21) Appl. No.: 16/529,212

(22) Filed: Aug. 1, 2019

(65) Prior Publication Data

US 2020/0039716 A1    Feb. 6, 2020

(30) Foreign Application Priority Data

Aug. 1, 2018    (DE) .................... 10 2018 212 836.7

(51) Int. Cl.
*B65D 77/20* (2006.01)
*B65D 1/34* (2006.01)
(Continued)

(52) U.S. Cl.
CPC .......... *B65D 77/2096* (2013.01); *B29C 51/20* (2013.01); *B29C 51/22* (2013.01);
(Continued)

(58) Field of Classification Search
None
See application file for complete search history.

(56) References Cited

U.S. PATENT DOCUMENTS 3,398,876 A    8/1968 Ward
3,398,877 A    8/1968 Jacobson
(Continued)

FOREIGN PATENT DOCUMENTS

CH         677473 A5    5/1991
DE        1295469 B    5/1969
(Continued)

OTHER PUBLICATIONS

Machine English Translation of EP2570351, Accessed Sep. 8, 2021 (Year: 2015).*

(Continued)

*Primary Examiner* — Francisco W Tschen
*Assistant Examiner* — Adrianna N Konves
(74) *Attorney, Agent, or Firm* — Brooks Kushman P.C.

(57) ABSTRACT

A reclosable package, and a machine and method for making that reclosable package that includes a tray for receiving a product and a substantially horizontal edge, wherein the horizontal edge extends circumferentially on an upper side of the tray and has a clamping portion releasably connected thereto. The package includes a top film across the tray, the edge and the clamping portion, and which may be releasably connected to the edge by a first sealed seam to seal the tray in a gas-tight manner. The top film may be connected to the clamping portion by a second sealed seam. A side face of the tray may include an undercut provided with a projection, the projection being suitable for locking the clamping portion in position when the clamping portion has been detached from the edge and is located between the projection of the undercut and the side face of the tray.

9 Claims, 16 Drawing Sheets

(51) Int. Cl.
- *B65B 47/04* (2006.01)
- *B29C 51/20* (2006.01)
- *B29C 51/42* (2006.01)
- *B29C 65/00* (2006.01)
- *B65B 7/28* (2006.01)
- *B29C 51/22* (2006.01)
- *B29L 31/00* (2006.01)

(52) U.S. Cl.
CPC .......... *B29C 51/427* (2013.01); *B29C 66/849* (2013.01); *B65B 7/2842* (2013.01); *B65B 47/04* (2013.01); *B65D 1/34* (2013.01); *B29L 2031/712* (2013.01)

(56) References Cited

U.S. PATENT DOCUMENTS

| | | | |
|---|---|---|---|
| 3,495,759 A | 2/1970 | Bergstrom et al. | |
| 4,495,135 A | 1/1985 | White | |
| 2007/0227192 A1* | 10/2007 | Meyer | C03B 9/3883 65/356 |
| 2017/0253406 A1 | 9/2017 | Wallander | |

FOREIGN PATENT DOCUMENTS

| | | | |
|---|---|---|---|
| DE | 2323425 A1 | 11/1974 | |
| DE | 202006000955 U1 | 6/2006 | |
| DE | 102015217886 A1 * | 3/2017 | .......... F01L 13/0036 |
| EP | 1838515 B1 | 10/2007 | |
| EP | 2774873 A1 | 9/2014 | |
| EP | 2570351 B1 | 3/2015 | |
| FR | 2318790 A1 | 2/1977 | |
| JP | 2016179834 A | 10/2016 | |
| WO | 2016057046 A1 | 4/2016 | |

OTHER PUBLICATIONS

Machine English Translation of DE102015217886A1, Accessed Sep. 8, 2021 (Year: 2017).*

European Search Report dated Apr. 21, 2020 (with English Machine Translation), Application No. 19188799.1-1016, Applicant Multivac Sepp Haggenmueller SE & Co. KG, 27 Pages.

European Search Report Application No. 19188799.1-1016, dated Apr. 21, 2020, Machine Translation & Letter identifiers that indicate relevance of the cited documents.

* cited by examiner

RECLOSABLE PACKAGE AS WELL AS THERMOFORM PACKAGING MACHINE AND METHOD

CROSS-REFERENCE TO RELATED APPLICATIONS

This application claims priority to German Patent Application No. 10 2018 212 836.7 filed on Aug. 1, 2018 to Florian Ferk, Norbert Kottek, and Tilman Hulwa, currently pending, the entire disclosure of which is incorporated herein by reference.

FIELD OF THE INVENTION

The present invention relates to a reclosable package as well as to a thermoform packaging machine and a method for operating the thermoform packaging machine for producing such the reclosable package.

BACKGROUND OF THE INVENTION

Packages comprising a tray thermoformed from a stable bottom film/foil or rigid film/foil and closed with a top film are increasingly used. Especially for food products, these packages can be reclosed after they have been opened for the first time, such reclosing being accomplished e.g. by an adhesive seam that retains, at least partially, its effect. Such a package is known, for example, from DE 10 2015 205 221 A1. However, it turned out that, in particular after repeated closing and opening, the adhesive seam often fails to provide a sufficient adhesive force for preventing an exchange of air between the package interior and the surroundings.

The thermoformed trays of the packages are usually configured to exhibit, when seen in cross-section, a rectangular shape, the shape of a parallelogram or a trapezoidal shape, in the case of which the horizontal cross-section of the tray becomes smaller from the top to the bottom. In all these cases, the tray can easily be removed in an upward direction or in an oblique upward direction from a mold cavity after thermoforming of the bottom film, as shown for example in U.S. Pat. No. 5,014,500.

However, it may sometimes be necessary to deviate from these standard shapes and to produce trays having on their side faces sections or bulges that widen downwards, so-called undercuts, or also recesses in the direction of the tray interior. This means that the tray can no longer be easily removed from the mold cavity after thermoforming, since these contours of the tray will collide with the respective parts of the mold cavity. This can be remedied by pushing away or folding away wall segments of the mold cavity, as described e.g. in EP 2570351 B1.

SUMMARY OF THE INVENTION

It is the object of the present invention to provide a package with an improved reclosable mechanism and a thermoform packaging machine for producing such a package.

According to the present invention, this object may be achieved by a package as well as by a thermoform packaging machine and a method for operating a thermoform packaging machine according to the disclosure.

A package according to the present invention, in particular a thermoformed film package, comprises a tray for placing a product therein with a substantially horizontal edge, which extends circumferentially on an upper side of the tray and which has releasably connected thereto, at least sectionwise, a clamping portion by means of a dividing line. The dividing line may be a cutting line or a perforation and may be configured such that, when the clamping portion may be angled or bent away from the horizontal about the dividing line, it will open and thus separate the clamping portion from the horizontal edge. The package additionally comprises a top film, which extends, at least sectionwise, across the tray, the edge and the clamping portion and which may be releasably connected to the edge by a circumferentially extending first sealed seam, thus sealing the tray in a gas-tight manner. In addition, the top film may be connected to the clamping portion by a second sealed seam. A side face of the tray has arranged thereon an undercut provided with a projection, the projection being suitable for locking the clamping portion, when the clamping portion has been detached from the edge at the dividing line and may be located, at least sectionwise, between the projection of the undercut and the side face of the tray.

In this way, the package can be opened by peeling the top film off from the tray. The clamping portion, which has been separated from the horizontal edge of the tray by a bending movement, remains connected to the top film. Likewise, a portion of the top film remains connected to the tray, expediently on a side of the tray opposite the clamping portion, by not fully peeling off the top film. If only part of the product may be removed from the tray, the packaging can now be closed again by placing the top film back onto the tray and by pivoting the clamping portion, which may be still connected to the top film, downwards and clamping it in position between the side face located adjacent the clamping portion and the projection of the undercut formed on this side face. As a result, the top film stretches and lies essentially flat on the upper horizontal edge of the tray, thus closing the tray. The package can still be opened and closed several times, the product remaining in the package being thus kept in an essentially air-tight manner.

According to an expedient embodiment, the distance between a vertex of the projection and the dividing line may be smaller than a width of the clamping portion. This ensures that the clamping portion cannot detach itself from the locking. For clamping the clamping portion in position and for removing it from its locked position behind the projection, sections of the packaging tray, e.g. the upper edge of the tray adjacent to the clamping portion or the side face having the undercut formed thereon, are elastically bent by applying a certain amount of force thereto, According to a practicable variant, the clamping portion has a contour that may be configured to ensure sufficient stability of the clamping portion, so that the latter will remain locked in position, when a pulling force may be applied thereto by the top film. The contour, which may e.g. be a notch formed sectionwise or continuously over the length of the clamping portion, may already be formed during the thermoforming process. As is generally known, structured surfaces have a higher resistance to bending and twisting than completely flat surfaces. Accordingly, the clamping portion will not be bent unintentionally nor will its locked condition be released.

According to an advantageous variant, the clamping portion may be provided with a third sealed seam. This means that the clamping portion may be connected to the top film by a total of two sealed seams and consequently in a particularly stable manner. In particular if the clamping portion has a contour for reinforcement, as described in the above paragraph, the contour may be arranged in the middle and the top film may be connected to the clamping portion on both sides of the contour.

According to a further variant, the undercut, when seen in the lateral profile, essentially corresponds to a quarter of an oval. Hence, the undercut does not have any hard corners or edges, especially along the outer contour thereof, a circumstance which, on the one hand, improves the haptic and optic properties of the package, in particular since this will prevent such corners and edges from being pressed in or deformed, and, on the other hand, also the forces occurring during locking of the clamping portion will advantageously be dissipated into the side faces of the tray.

Preferably, the second and/or third sealed seams are configured as non-releasable sealed seams. The sealed seams, which connect the top film to the clamping portion, can thus not be pulled open inadvertently by the consumer.

Preferably, the first sealed seam may be configured as a reclosable glued connection. After the package has been opened for the first time, the top film can thus be pressed on once more, so as to close the package in a particularly air-tight manner. In combination with the fact that the film may be held down by clamping the clamping portion behind the projection of the undercut, a particularly reliable, air-tight closure of the package may be accomplished.

A thermoform packaging machine according to the present invention, used for producing a package, in particular a package according to the preceding description, comprises a forming station for thermoforming a bottom film, wherein the forming station comprises, in turn, a forming tool lower part with a mold cavity and the mold cavity comprises a wall segment configured for forming a side face of the package with an undercut. The wall segment comprises an upper part and a lower part and may be supported such that it is displaceable from a first position, at which the mold cavity is in a thermoforming configuration, to a second position, at which the mold cavity is in a removal configuration. The thermoforming configuration may be suitable for thermoforming the bottom film, and the removal configuration may be suitable for lowering the forming tool lower part and thus for removing the package, in particular without causing any collision. The upper part may be here articulated on the lower part such that it can be displaced together therewith and execute, during such displacement, a rotary movement relative to the lower part. In the thermoforming configuration, the wall segment, including the upper and the lower part, may be arranged such that the forming station can be closed by bringing a forming tool upper part into contact with the forming tool lower part. The bottom film fed into the forming station can then be thermoformed into the mold cavity by establishing a pressure difference between its upper and lower sides and, possibly, by heating, i.e. it adapts to the surfaces and contours of the mold cavity, whereby a correspondingly shaped tray will be produced.

For removing the molded tray, the forming station may be opened and e.g. the forming tool lower part may be moved downwards, so as to release the tray for lateral removal. For a tray of the type described hereinbefore, such a relative movement of the tray and the mold cavity is, however, not easily possible, since the undercut formed on a side face would collide with the wall segment. This may be remedied by displacing the wall segment sidewards and outwards away from the mold cavity. However, since a package of the type described at the beginning may be provided with an undercut having a projection arranged thereon at the top, a mere sideward displacement is not possible either, since the projection would collide with the wall segment. This problem is, in turn, solved by subdividing the wall segment into an upper part and a lower part and by an additional rotary movement around the projection of the undercut executed by the upper part during the displacement of the wall segment. As a result, the thermoformed tray may be released and can be removed in a vertical movement from the mold cavity in an automated process.

The forming station may additionally have integrated therein a cutting tool for cutting the dividing line between the clamping portion and the upper edge of the tray as a precut line or a perforation. Such a cutting tool may, however, also be provided separately and expediently as the next station of the thermoform packaging machine, when seen in a downstream direction. Usually, a station for feeding the products into the tray, a sealing station for sealing the tray with a top film as well as a cutting station for cutting the sealed packages and for separating them from one another follow in a downstream direction.

Typically, the upper part may be articulated on the lower part such that, while executing the rotary movement during the displacement of the wall segment, the upper part will always remain below its uppermost vertical extension, which it has at the position in which the mold cavity may be in the thermoforming configuration. Previous comparable structural designs with movable wall segments of a mold cavity, of the type described above in the prior art, entail the problem that the movements of the wall segment are obstructed by other sections of the mold cavity or by the thermoformed bottom film and that e.g. a wall segment can only be displaced or rotated when the thermoformed tray simultaneously executes a vertical movement. In the case of the present embodiment, which will be explained in more detail hereinafter making reference to the figures, the upper part will not knock against an upper edge of the tray when executing the rotary movement. Hence, also the upper part itself may be used as a support surface for forming the upper edge of the tray. In addition, the displacement of the wall segment and the release of the packaging tray can be planned in the manufacturing process as a process that may be independent of the actual removal of the packaging trays.

According to a practicable variant, the upper part may be articulated on a rotary axle arranged on the lower part. This may be a particularly simple and expedient structural design, since the upper part does not require any further guides on or connections with the forming tool lower part. The transmission of force for causing the rotary movement may be therefore effected only via the lower part of the displaceable wall segment.

Usually, the upper part abuts in a form-fit manner on the lower part in the thermoforming configuration of the mold cavity. This means, on the one hand, that the edges of the upper part are flush with the lower part and the abutting sections of the mold cavity in such a way that no undesirable protrusions or depressions will exist during the thermoforming process, so that a perfect shape of the tray can be produced. In addition, however, the upper part may abut on the lower part in such a way that a forming pressure occurring during the thermoforming process will be dissipated into the lower part, thus preventing unintentional rotation about the rotary axle. For this purpose, a support surface of the upper part may be formed at an end remote from the rotary axle.

According to a further practicable variant, the upper part may be articulated on the lower part by means of a restoring mechanism, in particular a spring, so that it will return automatically to an end position, when the wall segment may be displaced. This kind of structural design may be particularly simple and can therefore be manufactured at a reasonable price.

Preferably, the forming tool lower part has nozzle bores for blowing air onto the wall segment so as to cool the same, the nozzle bores being closed, when the mold cavity is in the thermoforming configuration, and active, when the mold cavity is in the removal configuration. The nozzle bores may be opened and closed by an independent mechanism, which, however, may be synchronized with the movement of the wall segment. Alternatively, also a section of the wall segment itself may cover the nozzles bores in an air-tight manner or uncover them, depending on the respective position. It follows that, also in the latter case, cooling of the wall segment can take place in the open condition, if a discharge of air may be possible.

According to a further advantageous variant, the thermoform packaging machine may be provided with a linear drive, which may be in engagement with a slide so as to move the same, the slide having a curve-shaped control groove. The displaceable wall segment here comprises a pin, which may be in engagement with the control groove, so that the wall segment will be displaced linearly, when the drive is operated. As will be explained in more detail hereinafter making reference to the figures, this may be a particularly space-saving arrangement that converts a linear movement into a linear movement perpendicular thereto. In addition, the slide may be configured such that it comprises a plurality of control grooves in order to move several juxtaposed wall segments simultaneously. Furthermore, the slide may be supported such that and the control groove may be shaped such that the wall segment cannot be pushed open by a forming pressure, since only a lateral movement of the slide, parallel to the mold cavity, can cause the displacement of the wall segment.

Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
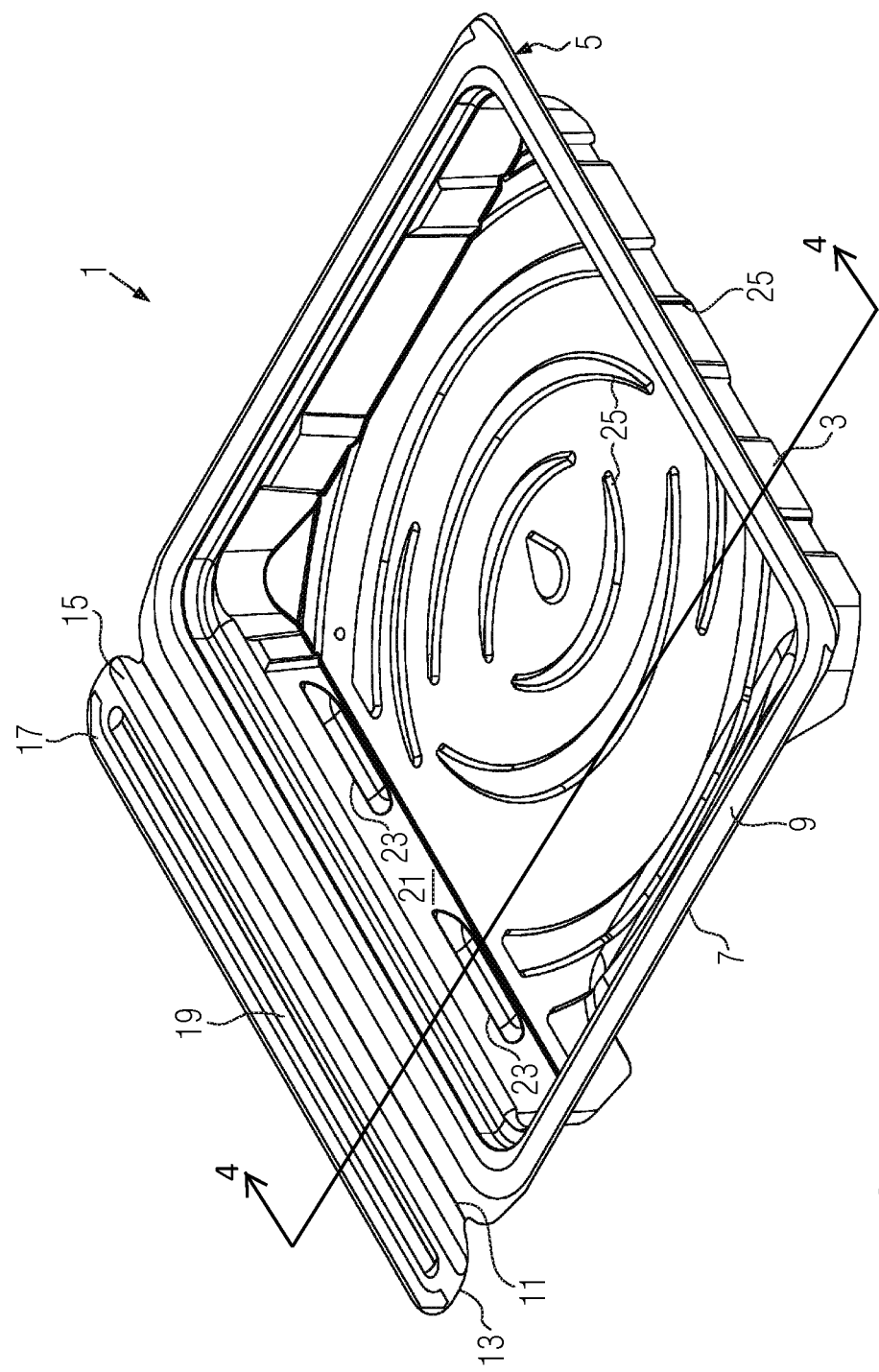
FIG. 1 is a perspective top view of one embodiment of a package produced by the packaging machine in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a thermoformed package 1, comprising a tray 3 and a top film, which is here not shown for the sake of clarity. The upper side 5 of the tray 3 has formed thereon a circumferentially extending, horizontal edge 7, on which a first sealed seam 9 connects the tray 3 to the top film. The edge 7 has attached thereto a clamping portion 13 via a dividing line 11, which may be a precut or a perforation. The one-piece top film is connected to the clamping portion 13 via second and third sealed seams 15, 17. To improve stability and handling, the clamping portion 13 has a centrally arranged contour 19. Usually, the sealed package 1 is separated and cut after the sealing process, so that the horizontal shape of the top film will be congruently flush with the tray 3, in particular with the edge 7 and the clamping portion 13. A side face 21 has formed thereon two undercuts 23. In addition, the tray 3 has further structures 25 for improving the stability and the handling of the package 1.

Figure 2:
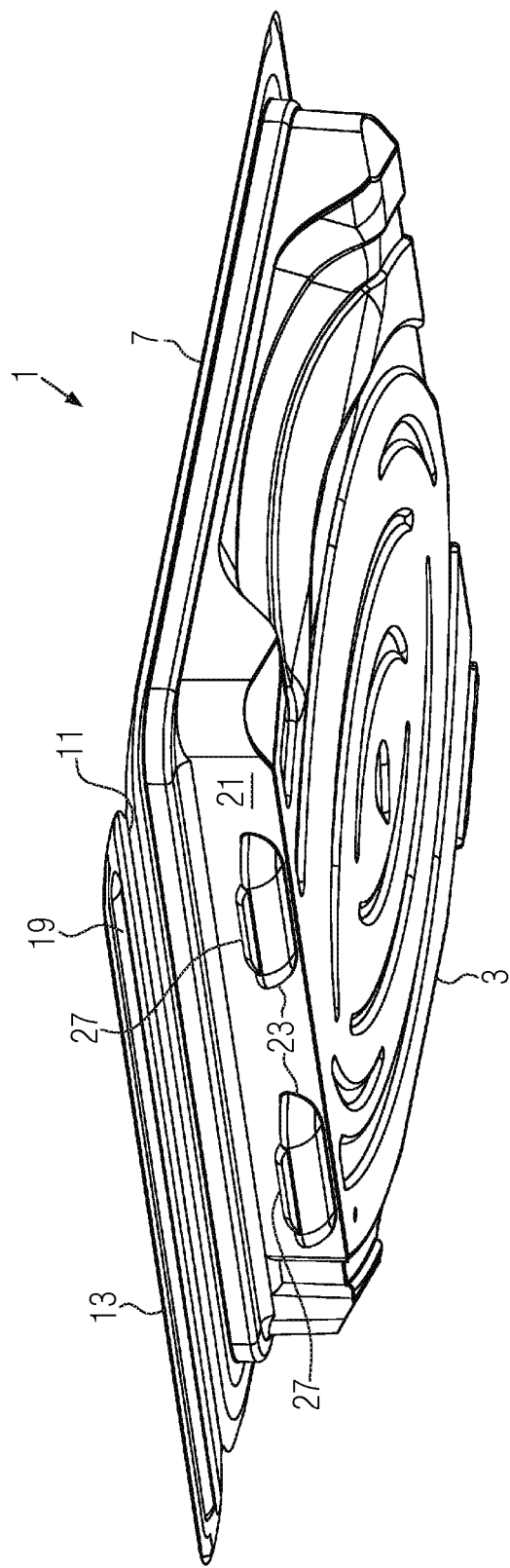
FIG. 2 is a perspective bottom view of the package of FIG. 1.

FIG. 2 shows the package 1 in a view obliquely from below. On the side face 21 located adjacent to the clamping portion 13, the two undercuts 23 can be seen, which, in cross-section, essentially correspond to a quarter of an oval. The undercuts 23 are each provided with a projection 27, behind which the clamping portion 13 is clamped in position, when the package 1 is re-closed. In addition to the embodiment of package 1, which is shown here and which comprises two undercuts 23, only one undercut 23 or more than two undercuts 23 may be formed on the side face 21.

Figure 3:
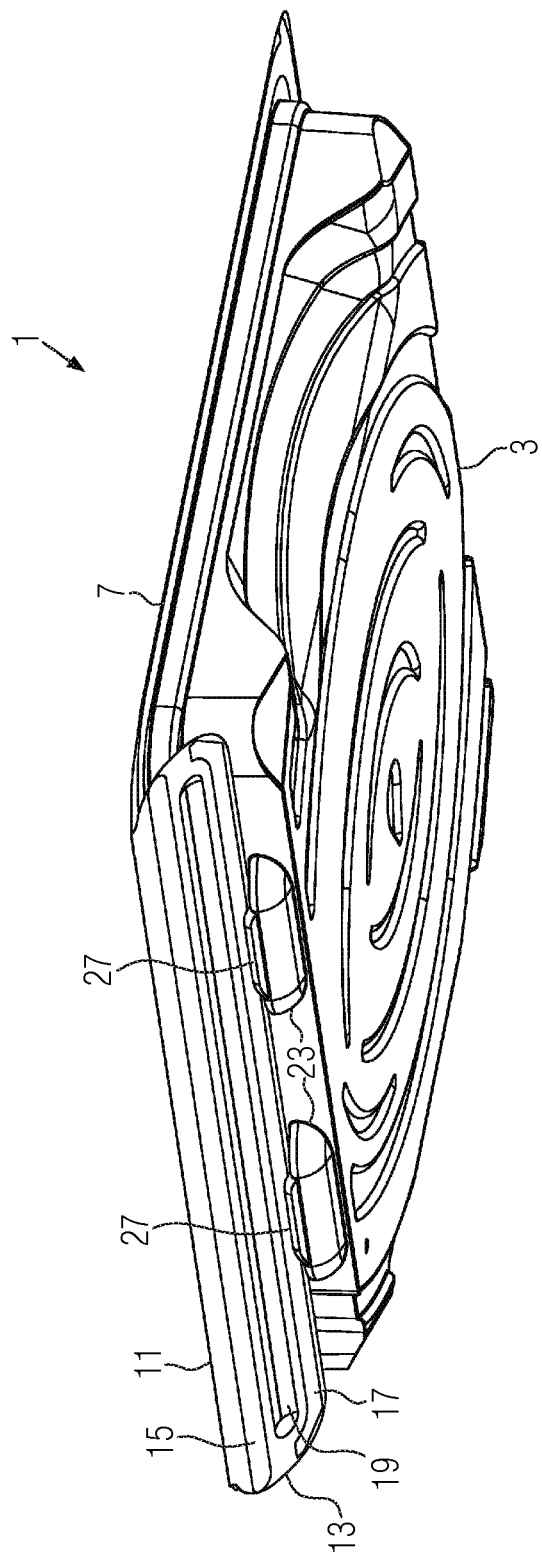
FIG. 3 is a perspective bottom view of the package of FIG. 1 showing a folded-down clamping portion in accordance with the teachings of the present disclosure.

FIG. 3 shows the package 1 according to FIGS. 1 and 2, in the case of which the clamping portion 13 has been folded down along the dividing line 11 and pushed to a position behind the projections 27. When the package 1 is opened for the first time, it will be advisable to take hold of the clamping portion 13 and to peel the top film, which is connected thereto, at least partially off from the tray 3, the first sealed seam 9 being thus detached, whereas, at least on the side of the edge 7 located opposite the clamping portion 13, the top film and the tray 3 still remain connected along part of the sealed seam 9. In this way, the clamping portion 13 can, as shown, be clamped in position behind the projections 27 and locked by the latter. As a result, the top film tightens and applies an outwardly directed counter tension to the clamping portion 13. Clamping the clamping portion 13 in position behind the projections 27 and removing it takes here place with an elastic bend or twisting of the clamping portion 13 and/or of the undercuts 23 or other parts of the tray 3, the stability existing at the locked position shown being sufficiently high for preventing the clamping portion 13 from jumping out independently.

Figure 4:
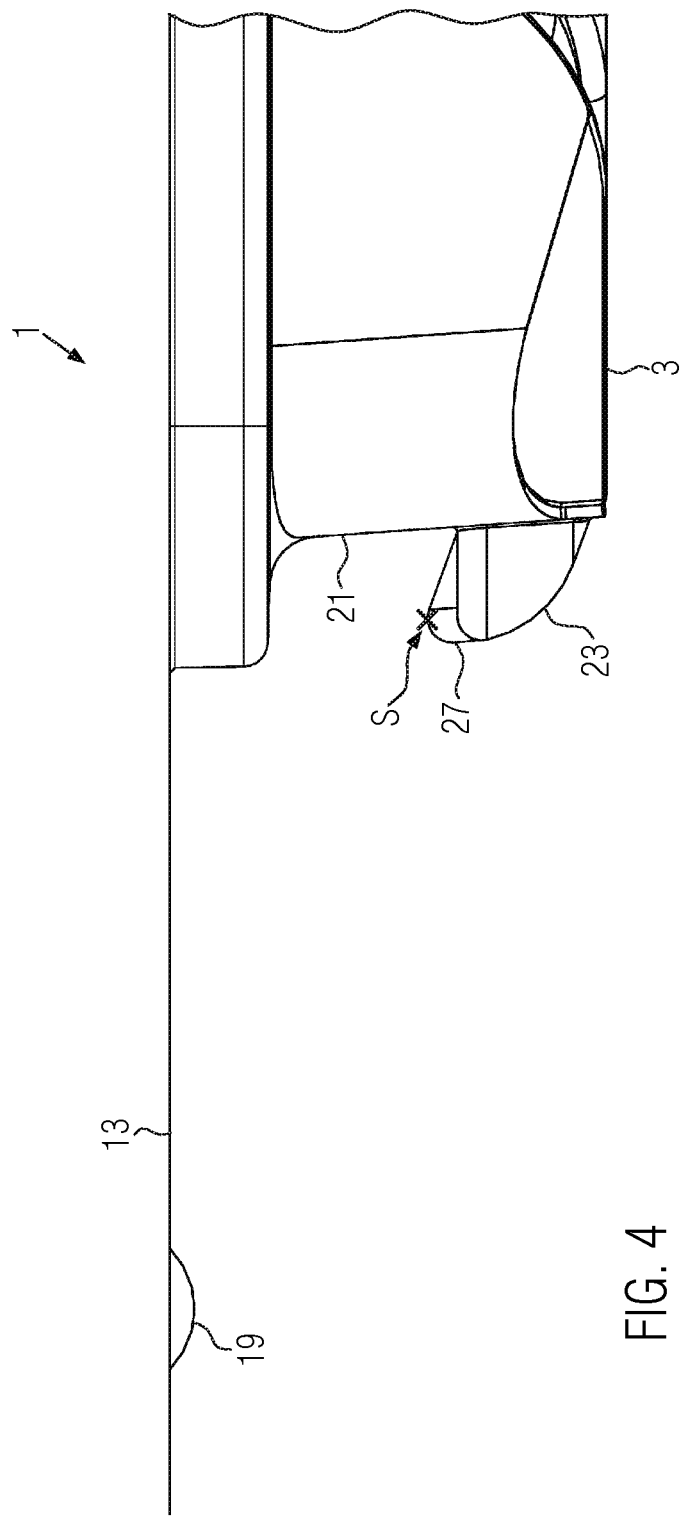
FIG. 4 is a sectional side view of the package of FIG. 1 cut along the line 4-4.

FIG. 4 shows a sectional side view of a package 1 with an undercut 23 and a clamping portion 13. What can be seen is the profile of the undercut 23 and of the projection 27, the highest point of which is the vertex S. From the vertex S to the side face 21, the profile of the projection 27 is here straight, but it may also be concave, by way of example. The clamping portion 13 comprises the contour 19 in the form of a downwardly directed bulge.

Figure 5:
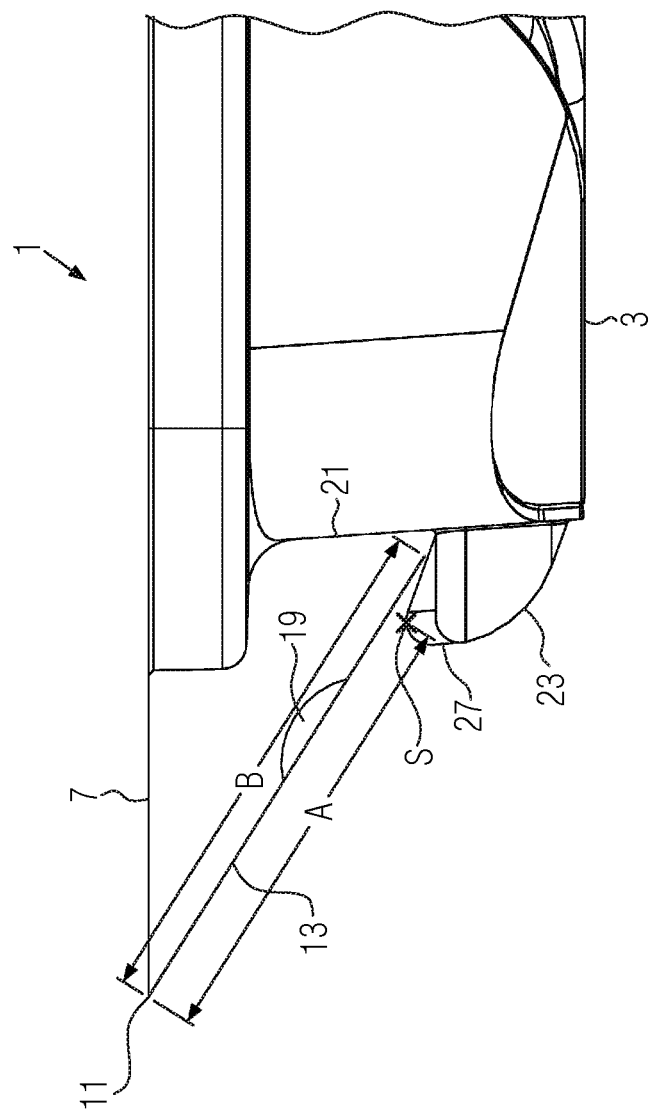
FIG. 5 is a sectional side view of the package of FIG. 1 cut along the line 4-4 showing a folded-down clamping portion in accordance with the teachings of the present disclosure.

FIG. 5 shows the sectional side view of a package 1 according to FIG. 4, the clamping portion 13 being pivoted downwards along the dividing line 11 and locked in position behind the projection 27. In order to prevent the clamping portion 13 from leaving the locked position independently, a width B of the clamping portion 13 is larger than the direct distance A between the vertex S and the dividing line 11. For clamping the clamping portion 13 in position behind the projection 27 as well as for releasing it, the various sections of the tray 3 are suitable for being elastically deformed to a minor extent. To this end, the clamping portion 13 may be bent slightly, an upwardly directed force may be applied to the upper horizontal edge 7 and, finally, the side face 21 may also twist to a limited extent.

Figure 6:
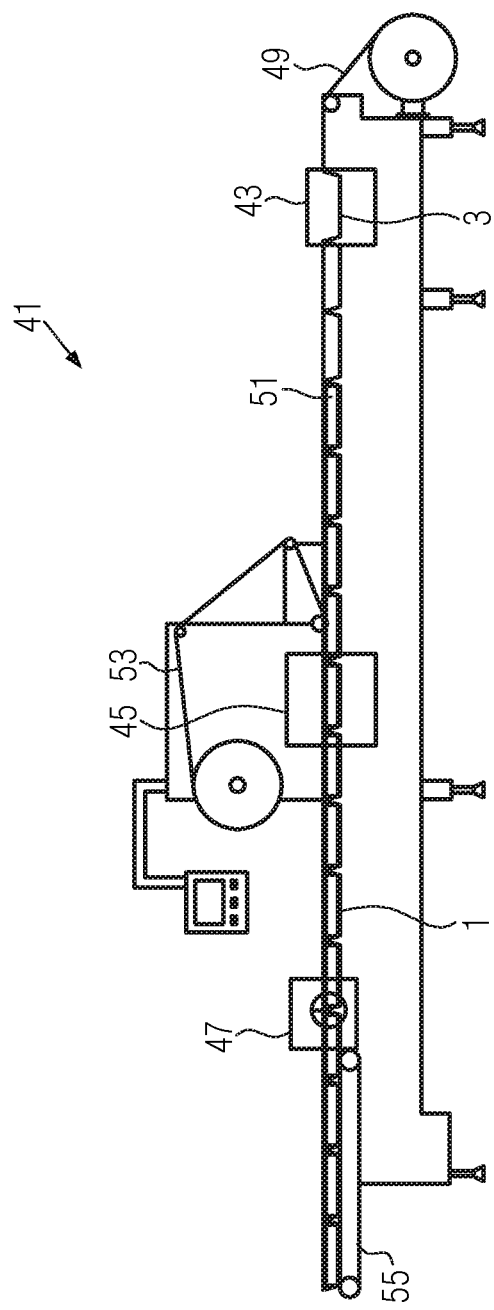
FIG. 6 is a schematic side view of one embodiment of a thermoform packaging machine in accordance with the teachings of the present disclosure.

FIG. 6 shows a schematic view of a thermoform packaging machine 41, comprising a forming station 43, a sealing station 45 and a cutting unit 47. A bottom film/foil 49 is first unwound from a roll and, e.g. fixed in position in conveyor chains on both sides, fed to the forming station 43, where a tray 3 with an undercut 23 of the type described above is thermoformed. For forming the dividing line 11 between the clamping portion 13 and the upper edge 7, a cutting tool may be provided in the forming station 43, or separately. It will be advisable to cut or perforate the dividing line 11 subsequent to the thermoforming of the tray 3, since it should only be provided in the bottom film 49 but not in the top film 53 extending across the latter. Subsequently, a product 51 is placed in the tray 3 and the tray 3 is sealed with the top film 53 in the sealing station 45. Thermoforming, filling and sealing may be carried out, per working step, for one, or for a plurality of trays 3 arranged side by side and/or one after the other. Making use of the cutting unit 47, the packages 1 are then cut and separated from one another, e.g. with round corner cuts of the upper edge 7 and the clamping portion 13. A discharge unit 55 conveys the packages 1 out of the thermoform packaging machine 41.

Figure 7:
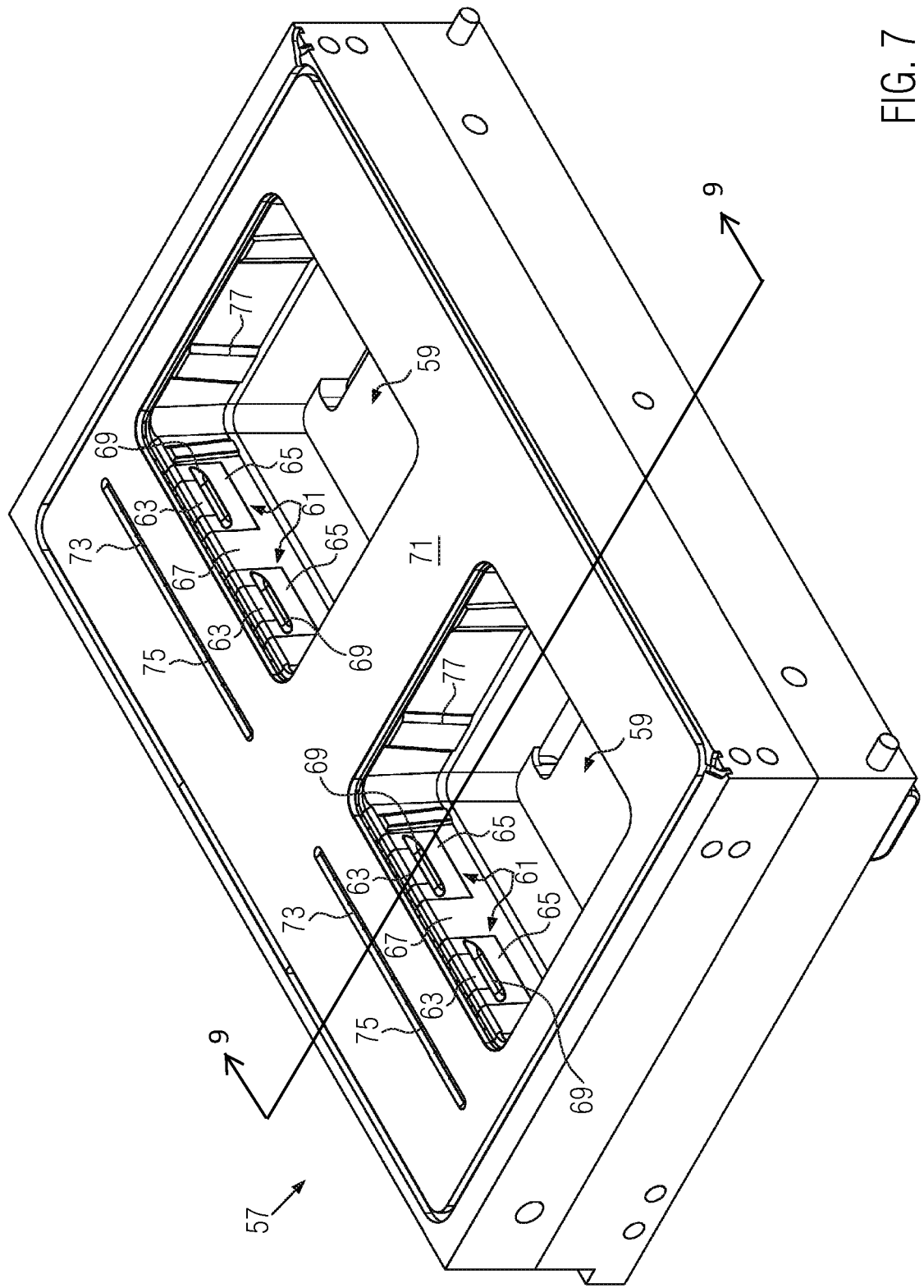
FIG. 7 is a perspective view from the top of one embodiment of a forming tool lower part with two mold cavities in the thermoforming configuration in accordance with the teachings of the present disclosure.

FIG. 7 shows a perspective view of a forming tool lower part 57 with two mold cavities 59 in a thermoforming configuration. Each mold cavity 59 has two displaceable wall segments 61 comprising an upper part 63 and a lower part 65. In the thermoforming configuration shown, the wall segments 61 are arranged in a form-fit and flush manner with the neighboring inner side faces 67 of the mold cavity 59, and they comprise a recess 69 for forming the undercut 23. An upper support surface 71 serves to form the upper horizontal edge 7 and the clamping portion 13, the edge 7 being cut to the desired dimensions later on by means of the cutting unit 47. For forming the contour 19 in the clamping portion 13, a recess 73 is provided, within which the necessary vacuum for thermoforming the bottom film 49 is established via air ducts 75. For forming the stability-improving structures 25 shown in FIG. 1, the mold cavity 59 has formed therein suitable profiles 77, which, however, are configured such that they will not obstruct the removal of the thermoformed tray 3.

Figure 8:
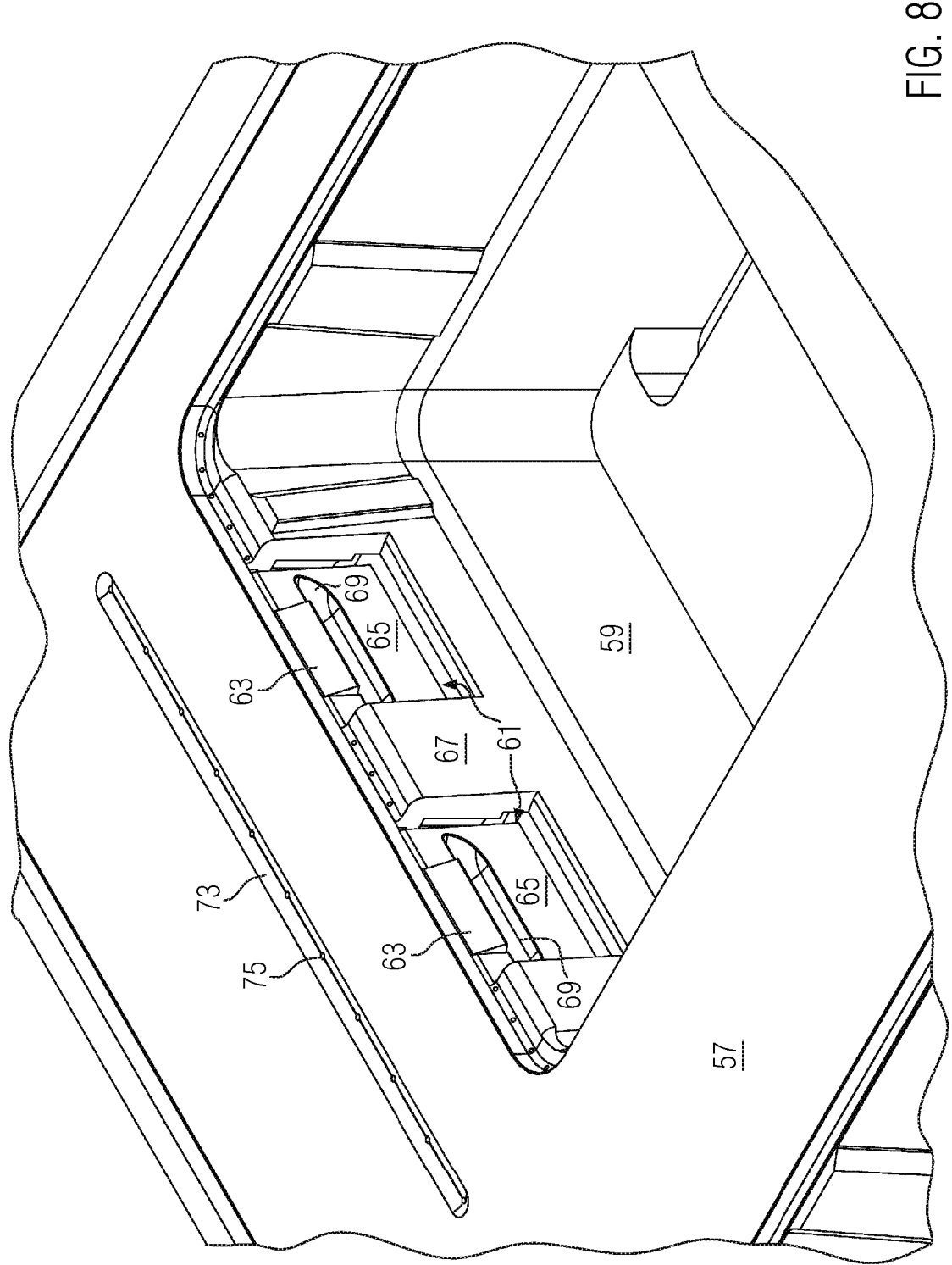
FIG. 8 is an enlarged perspective view of a mold cavity of the embodiment of the forming tool lower part of FIG. 7 shown in one embodiment of a removal configuration in accordance with the teachings of the present disclosure.

FIG. 8 shows an enlarged perspective view of a mold cavity 59 in a removal configuration. In order to allow the forming tool lower part 57 to be lowered, the wall segments 61 are displaced outwards, thus releasing the undercuts 23 of a thermoformed tray 3 for a vertical movement. Since each of the undercuts 23 has formed thereon a projection 27 on the upper side thereof, the upper parts 63 of the wall segments 61 are, in addition to the horizontal movement thereof, rotated around the projections 27, e.g. by an angle of approx. 30°.

Figure 9:
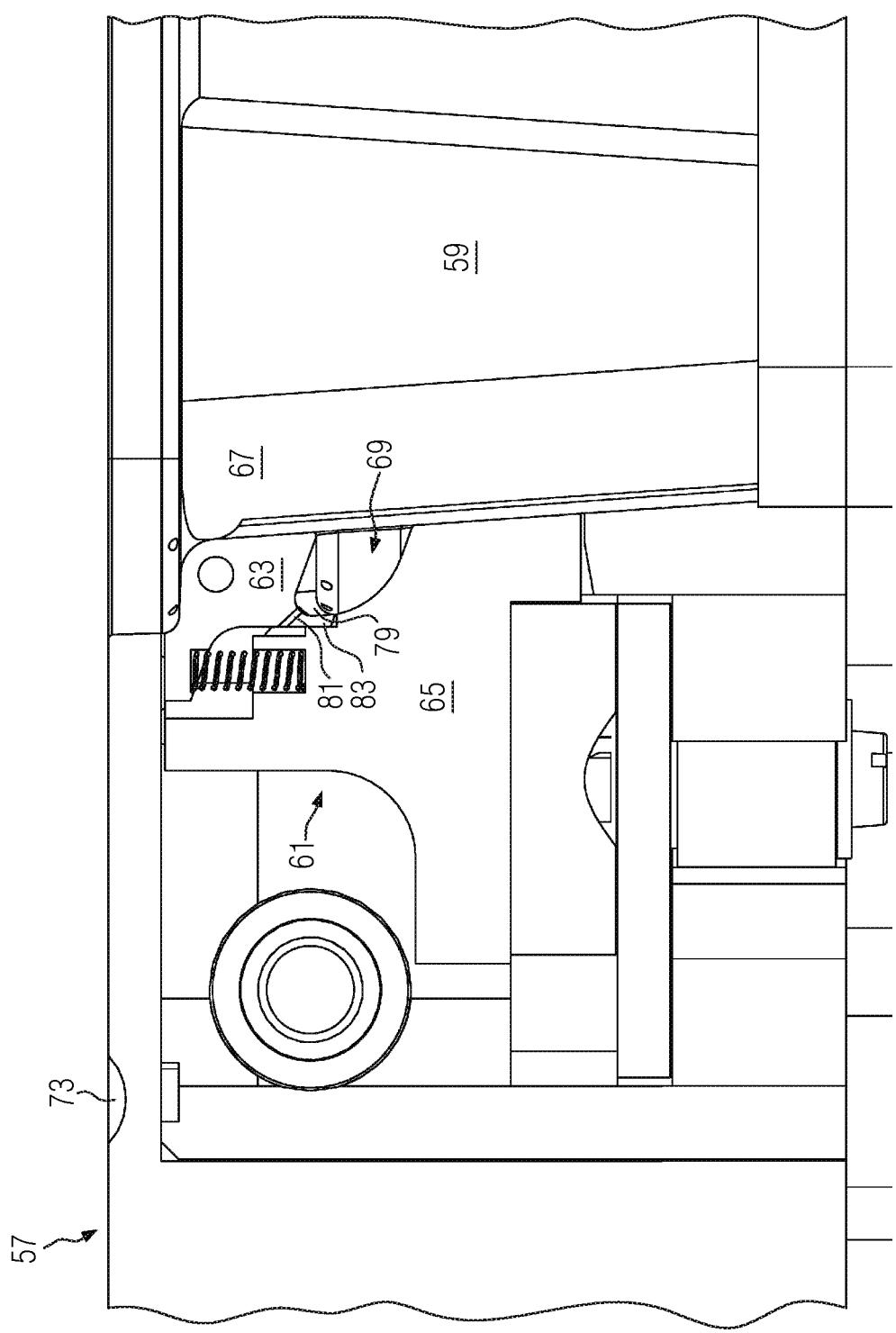
FIG. 9 is a sectional side view of the embodiment of the forming tool lower part of FIG. 7 cut along the line 9-9 showing one embodiment of a thermoforming configuration in accordance with the teachings of the present disclosure.

FIG. 9 shows a sectional side view of a mold cavity 59 and of the forming tool lower part 57, respectively, in a thermoforming configuration according to FIG. 7. The wall segment 61 and consequently the upper part 63 and the lower part 65 thereof are flush with the other side faces 67 of the mold cavity 59 and define the desired profile for forming the undercut 23 and the projection 27 of the tray 3. The upper part 63 has here formed therein a recess 79 for the projection 27 as part of the recess 69 for the undercut 23. In order to ensure that the bottom film 49 will be molded into the recesses 69, 79, one or a plurality of air ducts 81 may be provided for establishing a vacuum in the upper part 63. To this end, it will be advisable to arrange the air duct 81 at the most deeply recessed point of the recesses 69, 79. The upper part 63 is not only flush with the neighboring side faces 67 of the mold cavity 59 in a form-fit manner, but also abuts on the lower part 65 of the wall segment 61 with a lateral section 83 thereof. A forming pressure can thus be dissipated to the stably supported lower part 65.

Figure 10:
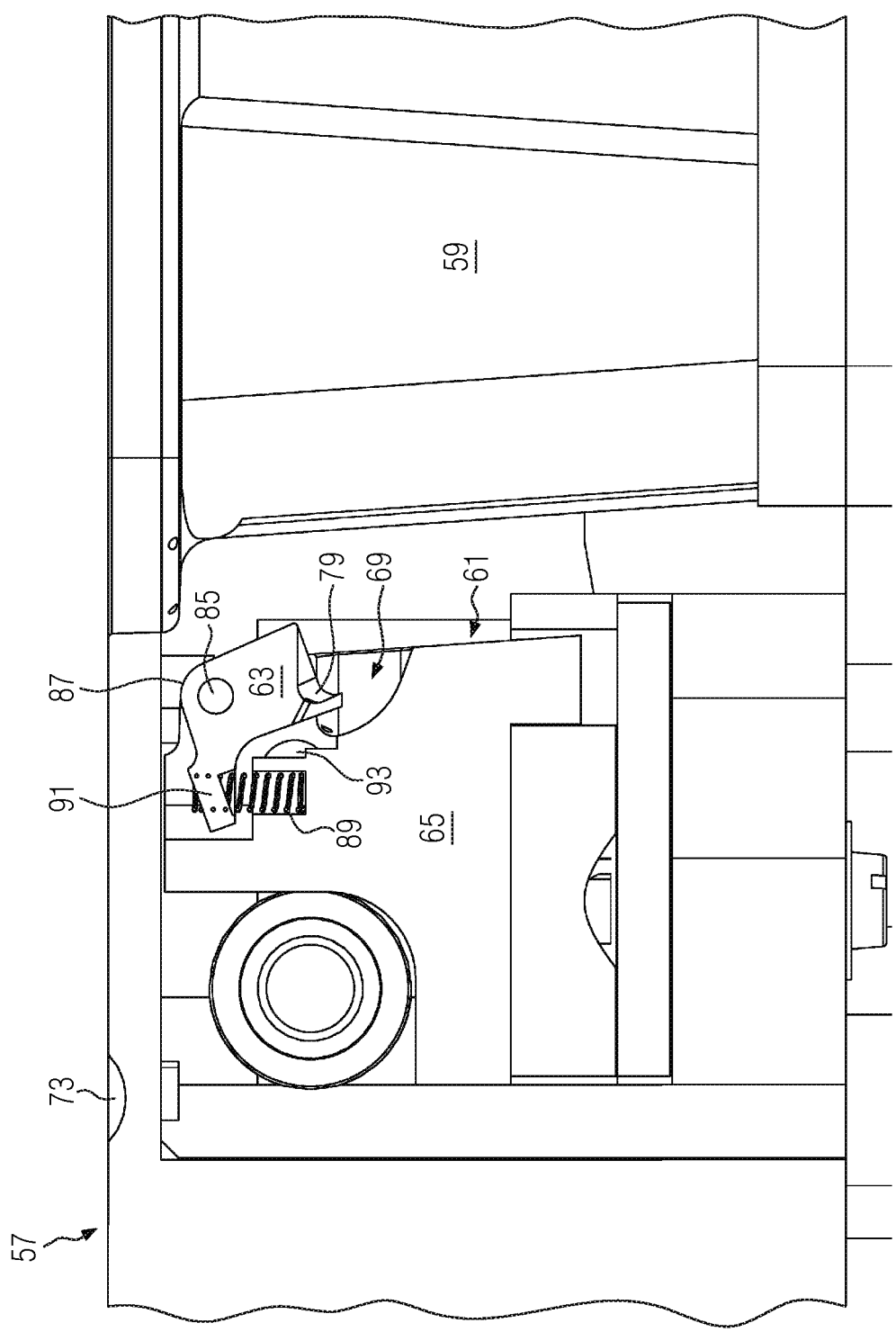
FIG. 10 is a sectional side view of the embodiment of the forming tool lower part of FIG. 7 cut along the line 9-9 showing one embodiment of a removal configuration in accordance with the teachings of the present disclosure.

FIG. 10 shows a sectional side view of a mold cavity 59 and of the forming tool lower part 57, respectively, in a removal configuration according to FIG. 8. The wall segment 61 is displaced outwards, in the present representation to the left, so as to release the tray 3 for vertical removal. The wall segment 61 has thus been moved to a position at which the undercut 23 will not collide with the wall segment 61, in particular the upper part 63 thereof, when the forming tool lower part 57 moves downwards. Due to the fact that a mere horizontal sideward displacement of the wall segment 61 is not possible due to the shape of the recess 79 because a section of the recess 79 would collide with the projection 27, the upper part 63 is supported such that it is rotatable about a rotary axle 85 and will be rotated upwards around the projection 27 up to the position shown, when the wall segment 61 is displaced. To this end, the rotary axle 85 is supported on the lower part 65. Due to the shape of an upper edge 87 of the upper part 63, the latter, while rotating through the relevant angular range, always remains below its uppermost vertical extension, which the upper part 63 also has during the thermoforming configuration. This is achieved e.g. by the fact that the upper edge 87 is configured in the form of a circular arc, which is concentric around the rotary axle 85, this shape being also suitable for forming the tray 3. A restoring mechanism 89, here in the form of a spiral spring, is connected to the upper part 63 via a lever section 91 of the latter and is counter supported on the lower part 65 and able to cause, by a pulling or pushing force, a rotation of the upper part 63 to a respective end position. The forming tool lower part 57 has formed therein a nozzle bore 93, which, e.g. in the thermoforming configuration of the forming tool lower part 57, is closed by the wall segment 61 and is open in the removal configuration, as shown, in order to allow a flow of air on and along the wall segment 61 and cool it in this way.

Figure 11:
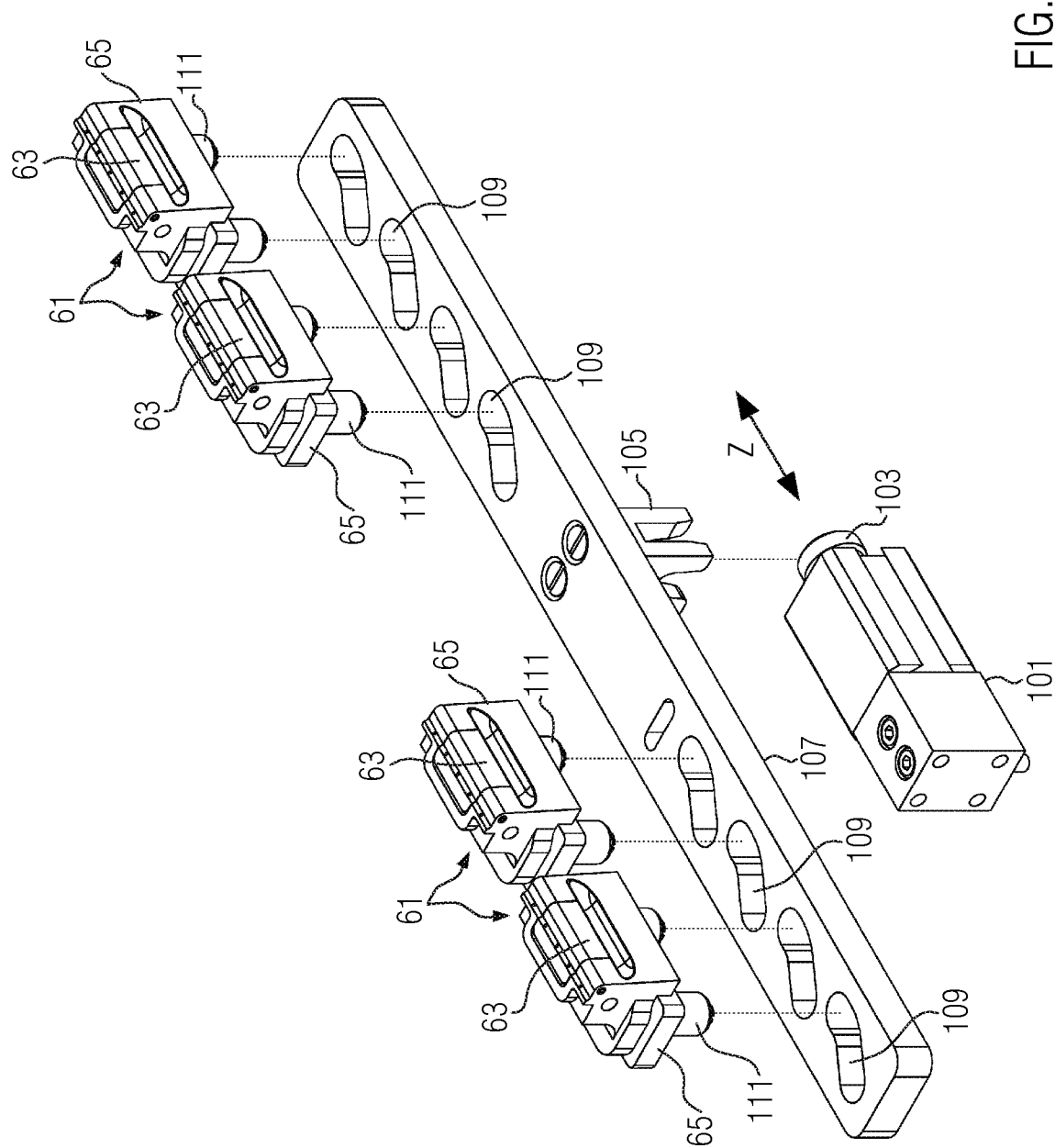
FIG. 11 shows a perspective view from the top of one embodiment of four wall segments of one embodiment of the thermoform machine in accordance with the teachings of the present disclosure showing its driving components in a thermoforming configuration.

FIG. 11 shows a perspective view of four wall segments 61 with driving components at the positions for the thermoforming configuration. The representation is comparable to an exploded view, the relative arrangement of the components being indicated by dashed lines. A linear drive 101, e.g. an electric motor or a pneumatic cylinder, comprises a rod having a plate 103 arranged at its end, the drive 101 being configured to move the plate 103 back and forth along the direction of movement Z. The plate 103 is in engagement with a bracket 105 of a slide 107 and causes a corresponding movement of the slide 107. The slide 107 has one or a plurality of curve-shaped control grooves 109, each having displaceably supported therein a pin 111 of the wall segment 61. As shown below, the wall segment 61 is supported in guides of the forming tool lower part 57 in such a way that the movement of the slide 107 along the direction of movement Z will cause a movement of the wall segment 61 in a direction perpendicular thereto. The wall segments 61 shown here each comprise two pins 111. However, it is also imaginable to provide only one pin 111, arranged e.g. in the middle, per wall segment 61.

Figure 12:
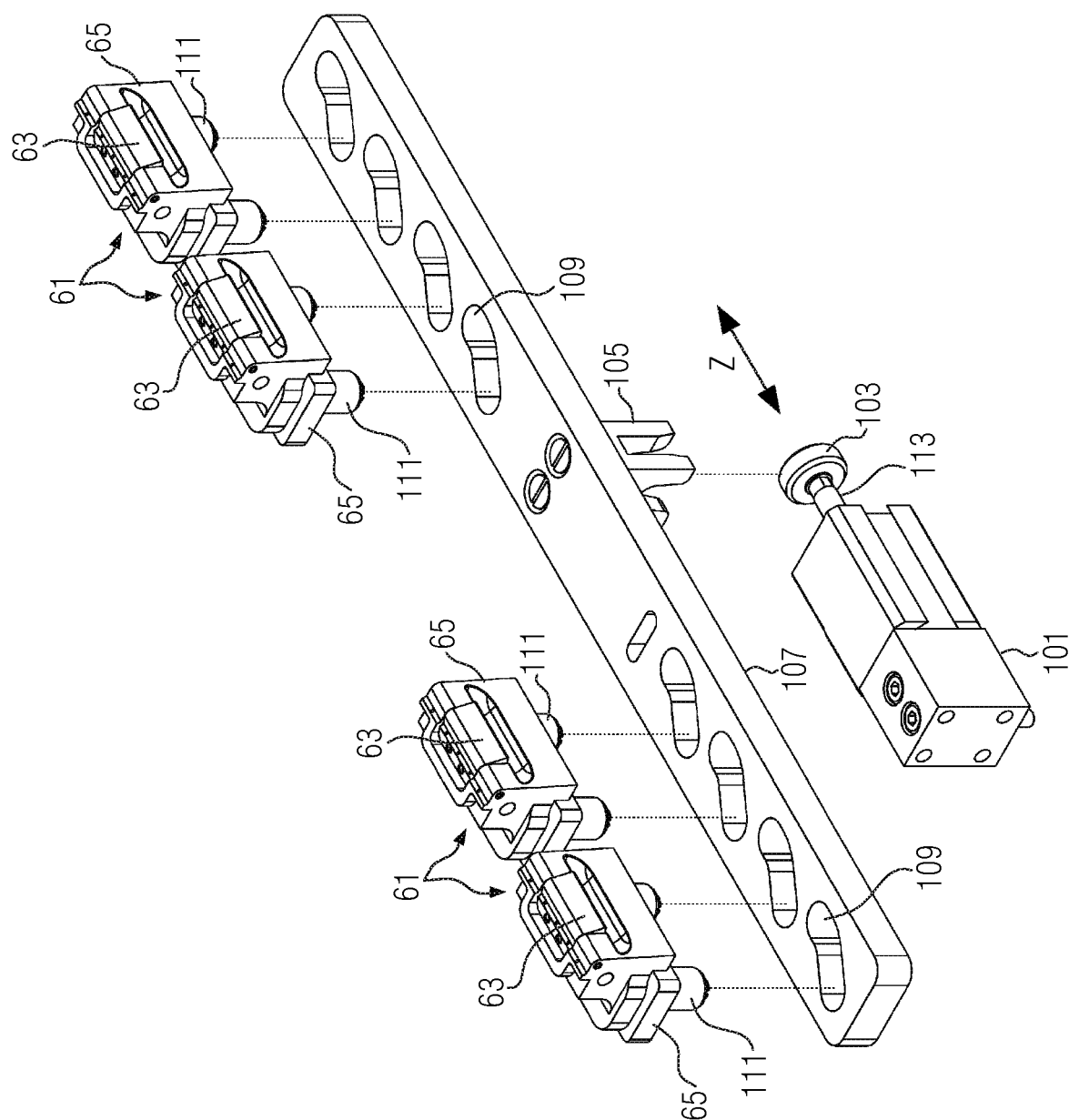
FIG. 12 shows a perspective top view of the embodiment of four wall segments of FIG. 11 showing its driving components in the removal configuration.

FIG. 12 shows a perspective view of four wall segments 61 with driving components in the removal configuration. In comparison with FIG. 11, the plate 103, and thus the slide 107, has been moved to the right by means of a rod 113. Since the wall segments 61 have no movement degree of freedom in the direction Z due to the fact that they are guided in the forming tool lower part 57, they only execute a movement perpendicular thereto, which is caused by the control grooves 109. At the same time, the rotary movement of the upper parts 63 of the wall segment 61 is caused.

Figure 13:
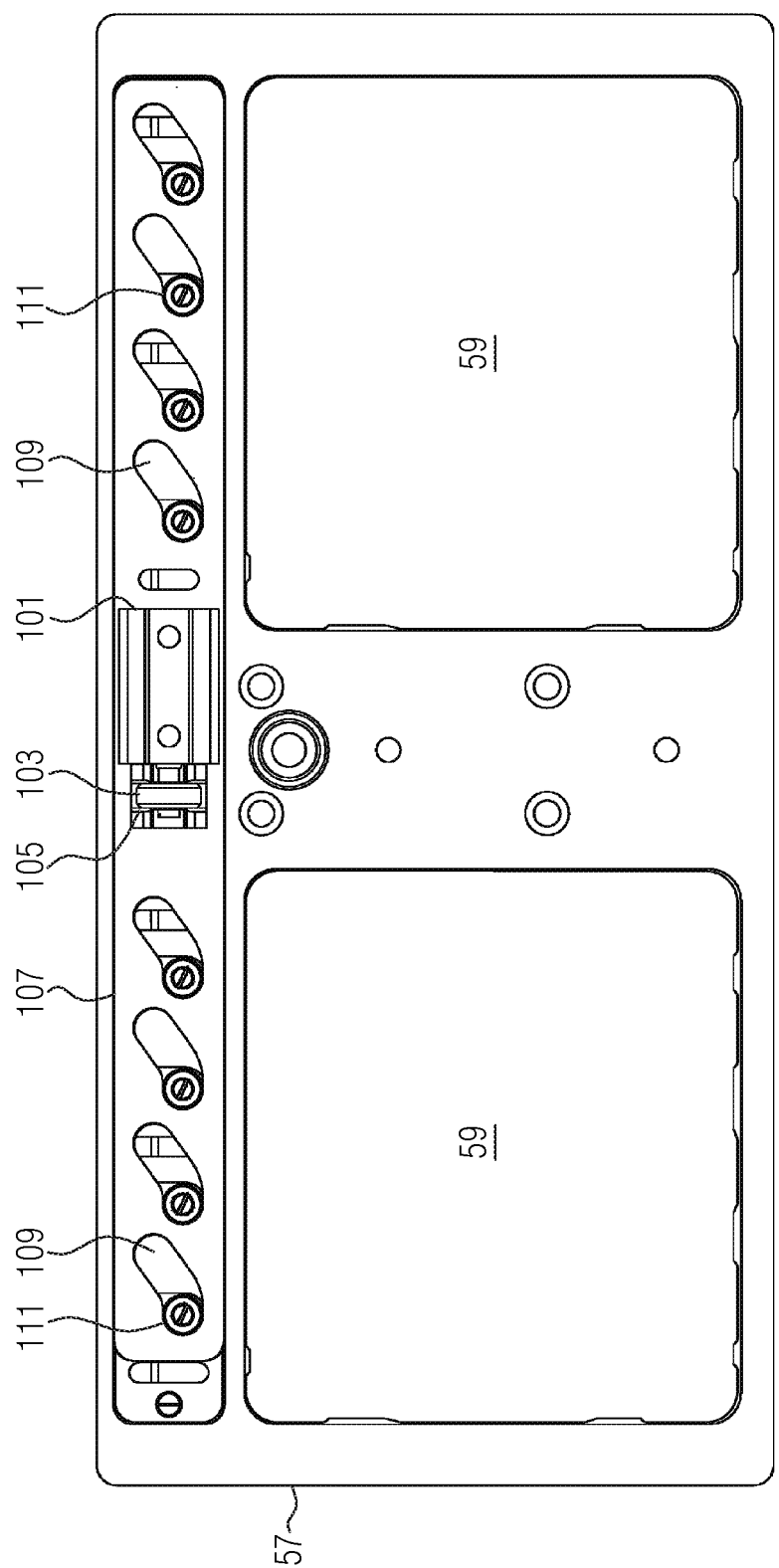
FIG. 13 is a sectional view of one embodiment of a forming tool lower part of one embodiment of the thermoform machine in accordance with the teachings of the present disclosure showing an embodiment of the thermoforming configuration.

FIG. 13 shows a horizontal sectional view of a forming tool lower part 57 in a thermoforming configuration. The plate 103 is at a retracted position and the slide 107 is at a position on the right-hand side in this representation. Hence, the control grooves 109 displace the pins 111 and thus the wall segment 61 in such a way that a tray 3 can be thermoformed.

Figure 14:
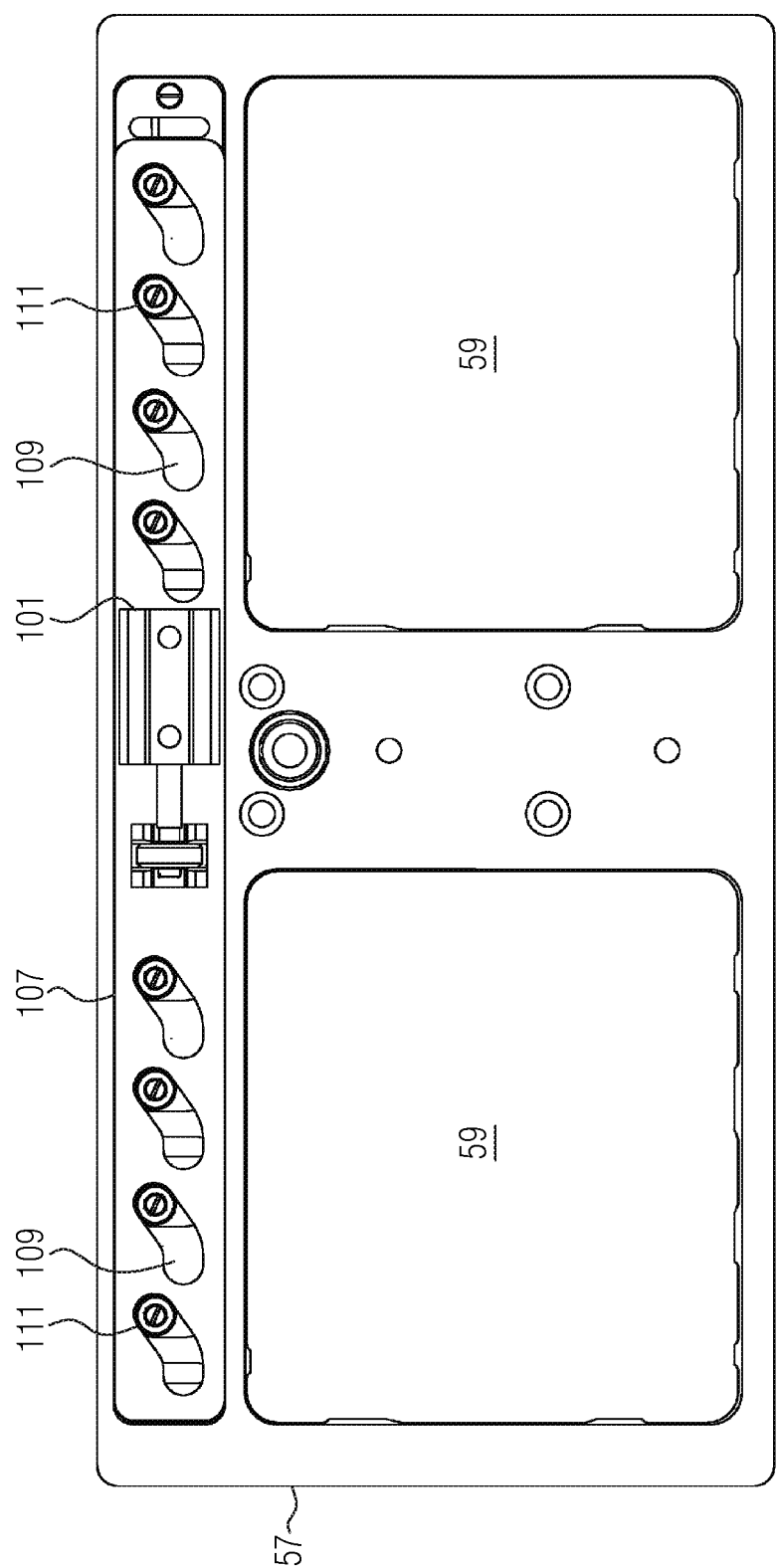
FIG. 14 is a sectional view of one embodiment of a forming tool lower part of one embodiment of the thermoform machine in accordance with the teachings of the present disclosure showing an embodiment of the removal configuration.

FIG. 14 shows a horizontal sectional view of a forming tool lower part 57 in the removal configuration. The slide 107 has here been displaced to the left, so that the pins 111 and thus the wall segments 61 are moved away from the mold cavity 59, so as to allow a downward movement of the forming tool lower part 57 and thus further conveying of the trays 3 after thermoforming.

Figure 15:
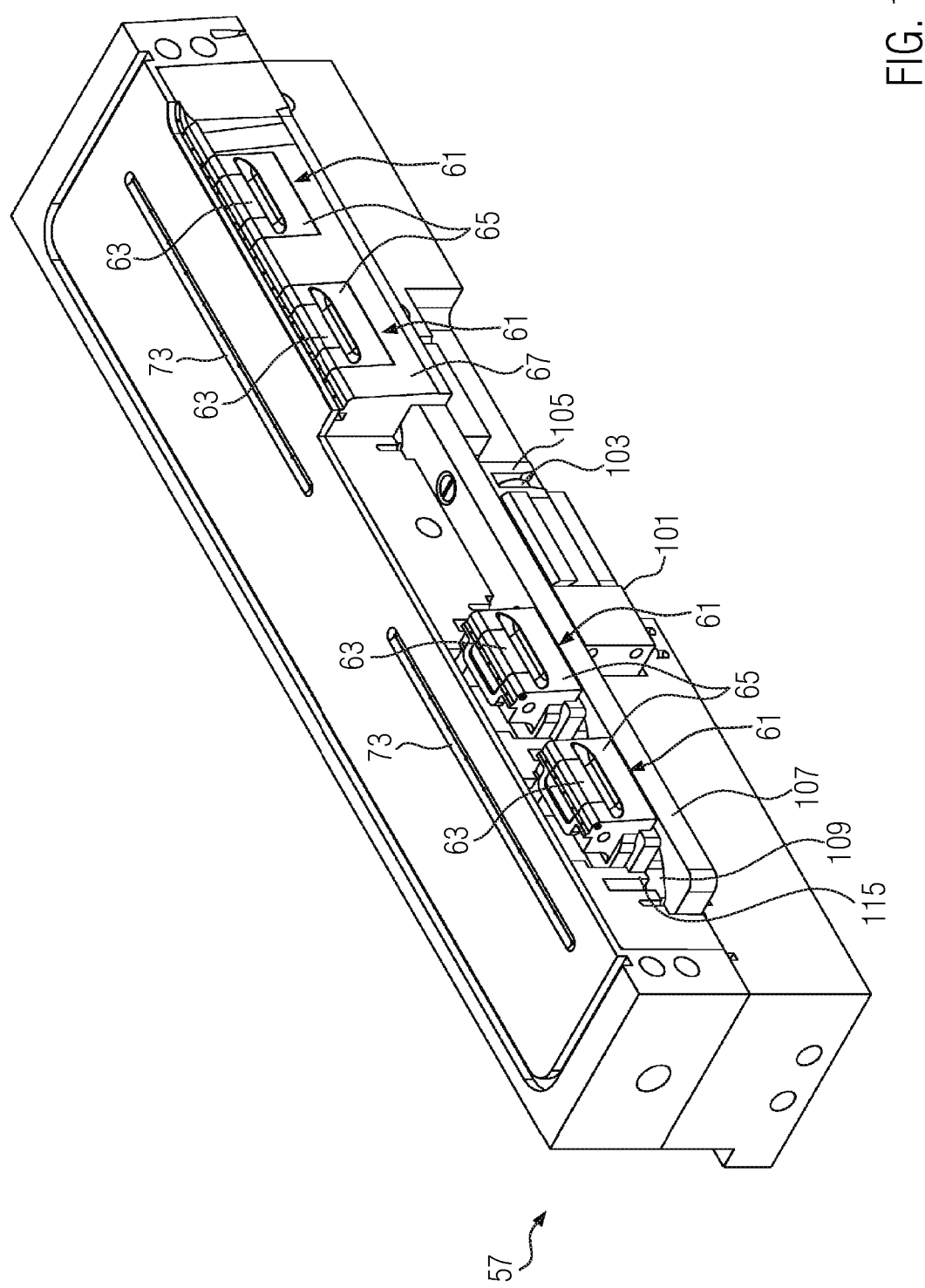
FIG. 15 is a perspective top view of one embodiment of an angled section of a forming tool lower part of one embodiment of the thermoform machine in accordance with the teachings of the present disclosure showing an embodiment of the thermoforming configuration.

FIG. 15 shows a perspective view of an angled section of the forming tool lower part 57 in the thermoforming configuration according to FIGS. 11 and 13. The right part of the representation shows the side face 67 of the mold cavity 59, so as to show the flush arrangement of the wall segments 61 with this very side face 67 in the thermoforming configuration. In the left part of the representation, however, the side face 67 has been omitted in order to show the slide 107. In addition, it can be seen how the wall segments 61 abut on guides 115 of the forming tool lower part 57 in order to be moved towards or away from the mold cavity 59 by the movement of the control grooves 109.

Figure 16:
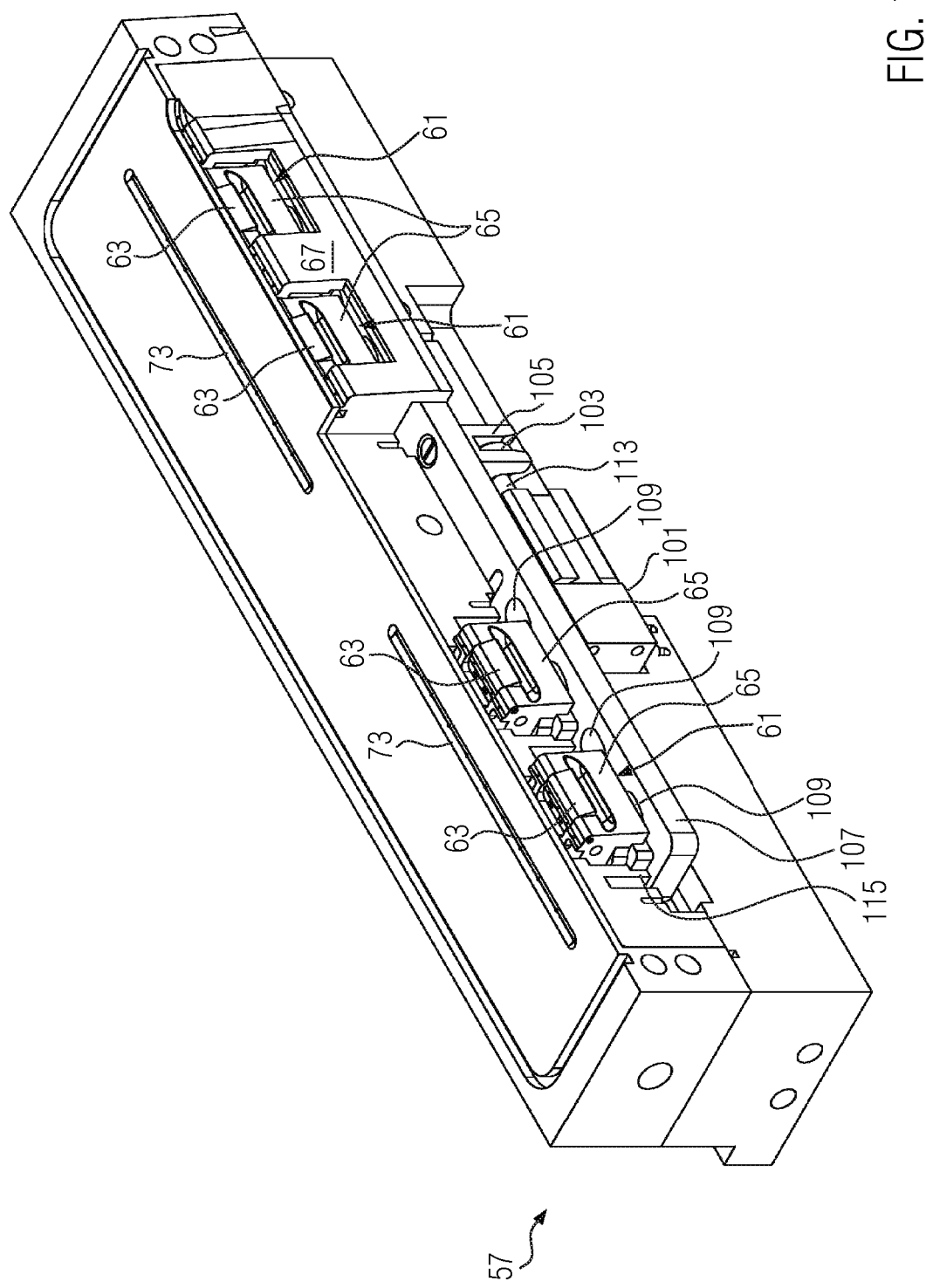
FIG. 16 is a perspective top view of one embodiment of an angled section of a forming tool lower part of one embodiment of the thermoform machine in accordance with the teachings of the present disclosure showing an embodiment of the removal configuration.

FIG. 16 shows a perspective view of an angled section of the forming tool lower part 57 in the removal configuration according to FIGS. 12 and 14. Due to the displacement of the slide 107 to the right, the wall segments 61 have been moved away from the mold cavity 59 and in an outward direction by means of the control grooves 109 and the pins 111 arranged therein. At the same time, the upper parts 63 have been rotated.

In the following, the mode of operation of a thermoform packaging machine 41 disclosed by the present invention and used for the production of a package 1 will be explained.

As has already been shown in FIG. 6, a bottom film 49 is first fed to a forming station 43, where it is clamped in position between a forming tool lower part 57 and a forming tool upper part during closing of the forming station 43, whereupon it is, while establishing suitable temperatures and pressure differences, thermoformed into a mold cavity 59 so as to produce a tray 3. In so doing, an undercut 23 with a projection 27 is formed on a side face 21 by means of a suitable recess 69 defined in a displaceable wall segment 61. Subsequently, a dividing line 11 between an upper edge 7 and a clamping portion 13, which is formed in extension of the upper edge 7, is cut or perforated in, or subsequent to the forming station 43, the dividing line 11 being configured such that the clamping portion 13 initially remains connected to the edge 7, but will become detached from the edge 7 when the dividing line 11 is bent for the first time. In order to allow the thermoformed tray 3 to be removed from the mold cavity 59 upwards, without the undercut 23 colliding with parts of the forming tool lower part 57, the wall segment 61 is displaced outwards and away from the mold cavity 59. In the course of this movement, an upper part 63 of the wall segment 61 additionally executes a rotary movement, in order to avoid a collision with a projection 27 of the undercut 23 during the horizontal displacement movement of the wall segment 61.

After lowering of the forming tool lower part 57 and after further conveying, the tray 3 is filled with a product 51 and sealed with a top film 53 in a gas-tight manner in a sealing station 45. The top film 53 extends here up to and beyond the edge 7 of the tray 3 as well as across the clamping portion 13, and a first sealed seam 9 with the top film 53 is formed on the edge 7 and a second sealed seam 15 and, optionally, a third sealed seam 17 with the top film 53 are formed on the clamping portion 13. Subsequently, the contour of the upper edge 7 and of the clamping portion 13 are cut in a cutting unit 47, the corners being preferably given a round cut. If a plurality of trays 33 are formed and sealed side by side, or one after the other, per working step in the thermoform packaging machine 41, the packages 1 will also be separated from one another by means of the cutting unit 47. Making use of the discharge unit 55, the individual packages 1 are then taken away.

Taking as a basis the above described embodiments of a package 1, a thermoform packaging machine 41 and a method for operating such a thermoform packaging machine 41, many variations thereof are imaginable. For example, the mold cavity 59 may also be round or oval in shape at the sides for producing corresponding packages 1, also the wall segments 61 being adapted accordingly in this case. The displaceable wall segments 61 may be provided with knobs, pins or the like, instead of being provided with a recess 69 for an undercut 23, so as to form contours that project into the package. Instead of providing one projection 27 per undercut 23, it is also imaginable to form a wider undercut 23 with two or more projections 27.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A thermoform packaging machine for producing a package, the thermoform packaging machine comprising:
a forming station for thermoforming a bottom film to form a tray, wherein the forming station comprises a forming tool lower part having a mold cavity, and the mold cavity comprises a wall segment configured to form a side face of the tray to include an undercut, wherein the wall segment comprises an upper part and a lower part and the wall segment is displaceably supported and capable to be displaced between a first position, at which the mold cavity is in a thermoforming configuration suitable for thermoforming the bottom film, and a second position, at which the mold cavity is in a removal configuration suitable for lowering the forming tool lower part, and wherein the upper part of the wall segment is rotatably mounted on the lower part of the wall segment such that the upper part and the lower part may be displaced together, and such that the upper part is capable to execute a rotary movement relative to the lower part during the displacement.

2. The thermoform packaging machine according to claim 1, wherein the upper part is disposed relative to the lower part of the wall segment such that during the rotary movement the upper part always remains below an uppermost vertical extension of the upper part when the mold cavity is in the thermoforming configuration.

3. The thermoform packaging machine according to claim 1, wherein the upper part is rotatable on a rotary axle included on the lower part of the wall segment.

4. The thermoform packaging machine according to claim 1, wherein the upper part abuts on the lower part of the wall segment in a form-fit manner in the thermoforming configuration of the mold cavity.

5. The thermoform packaging machine according to claim 1, wherein the upper part is rotatable relative to the lower part of the wall segment using a restoring mechanism so that the upper part will return automatically to one of the first position or the second position when the wall segment is displaced to the other one of the first position or the second position.

6. The thermoform packaging machine according to claim 1, wherein the forming tool lower part includes a plurality of nozzle bores for blowing air onto the wall segment so as to cool the wall segment, wherein the plurality of nozzle bores are moveable between a closed position when the mold cavity is in the thermoforming configuration, and an active position when the mold cavity is in the removal configuration.

7. The thermoform packaging machine according to claim 1, further comprising a linear drive in driving engagement with a slide, wherein the linear drive is capable to move the slide, and wherein the slide has a curved control groove, and wherein the displaceable wall segment comprises a pin that is in operable engagement with the curved control groove such that the wall segment will be linearly displaced when the drive is operated.

8. A method for operating a thermoform packaging machine to produce a package, wherein the thermoform packaging machine includes a forming station for thermoforming a bottom film to form a tray, and the forming station includes a forming tool lower part having a mold cavity, the method comprising:
thermoforming the tray with a side face having an undercut in the bottom film within the mold cavity of the forming station, wherein the mold cavity includes a wall segment configured to form the side face of the tray to include the undercut, the wall segment includes an upper part and a lower part, the wall segment is displaceably supported and capable to be displaced between a first position, at which the mold cavity is in a thermoforming configuration suitable for thermoforming the bottom film, and a second position, at which the mold cavity is in a removal configuration suitable for lowering the forming tool lower part, and the upper part of the wall segment is rotatably mounted on the lower part of the wall segment such that the upper part and the lower part may be displaced together, and such that the upper part is capable to execute a rotary movement relative to the lower part during the displacement;

forming a dividing line between an edge extending circumferentially on an upper side of the tray and a clamping portion of the tray;

closing the tray with a top film;

forming a circumferentially extending, gas-tight and releasable first sealed seam between the top film and the tray along the edge;

forming a second sealed seam between the top film and the clamping portion; and laterally displacing the wall segment of the mold cavity comprising the upper part and the lower part to remove the tray after the thermoforming, and rotating the upper part relative to the lower part to allow the tray to move past a projection of the undercut.

9. The thermoform packaging machine according to claim 1, wherein the wall segment is displaceable sidewards.

* * * * *